(12) United States Patent
Hori (10) Patent No.: US 12,344,436 B2
(45) Date of Patent: Jul. 1, 2025

(54) CONVEYING TOOL

(71) Applicant: Horitec Co., Ltd., Kyoto (JP)

(72) Inventor: Hiromichi Hori, Kyoto (JP)

(73) Assignee: Horitec Co., Ltd., Kyoto (JP)

( * ) Notice: Subject to any disclaimer, the term of this patent is extended or adjusted under 35 U.S.C. 154(b) by 73 days.

(21) Appl. No.: 18/551,839

(22) PCT Filed: Feb. 25, 2022

(86) PCT No.: PCT/JP2022/008051
§ 371 (c)(1),
(2) Date: Dec. 27, 2023

(87) PCT Pub. No.: WO2022/202105
PCT Pub. Date: Sep. 29, 2022

(65) Prior Publication Data
US 2024/0199275 A1    Jun. 20, 2024

(30) Foreign Application Priority Data

Mar. 23, 2021  (JP) ............................. 2021-000988 U
Oct. 14, 2021  (JP) ................................. 2021-168568

(51) Int. Cl.
*B65D 21/08*    (2006.01)
*A47F 5/13*    (2006.01)
(Continued)

(52) U.S. Cl.
CPC .............. *B65D 21/086* (2013.01); *A47F 5/13* (2013.01); *B65D 21/0213* (2013.01); *B65G 7/12* (2013.01);
(Continued)

(58) Field of Classification Search
CPC .... B65D 21/086; B65D 21/0213; B65D 9/18; B65D 7/32; B65D 9/14; B65D 9/22;
(Continued)

(56) References Cited

U.S. PATENT DOCUMENTS 797,871 A * 8/1905 Smith ................ B65D 11/1833
220/494
2,747,748 A * 5/1956 Barefoot ................ A21C 15/00
294/142

(Continued)

FOREIGN PATENT DOCUMENTS

| JP | S50-014817 Y | 5/1975 |
| JP | S61-141220 U | 9/1986 |
| JP | 3163607 U | 10/2010 |

*Primary Examiner* — Devin K Barnett
(74) *Attorney, Agent, or Firm* — Hodgson Russ LLP (57) ABSTRACT

A carrier C has a placing frame 1, left and right posts 2, left and right gripping frames 3, and inserting portions 4. The placing frame 1 has front and rear left-right frames 10 that extend in the left-right direction and on which firewood is to be placed. The left and right posts 2 each have front and rear post bodies 21 that are joined to the placing frame 1 and extend in the vertical direction. The left and right gripping frames 3 each are each being bridged between upper ends of the front and rear post bodies 21. The insertion portions 4 each are joined to the post 2, into which the gripping frame 3 of another carrier is inserted from below, thereby connecting the carriers C together vertically.

7 Claims, 6 Drawing Sheets

(51) Int. Cl.
  *B65D 21/02* (2006.01)
  *B65G 7/12* (2006.01)
  *A47F 5/10* (2006.01)
  *A47F 5/14* (2006.01)
  *A47F 7/00* (2006.01)
(52) U.S. Cl.
  CPC . *A47F 5/10* (2013.01); *A47F 5/14* (2013.01); *A47F 7/0035* (2013.01)
(58) Field of Classification Search
  CPC ..... B65D 9/10; B65G 7/12; A47F 5/10; A47F 5/13; A47F 5/14; A47F 7/00; A47F 7/0021; A47F 7/0035; A47B 87/0207; A47B 81/005; A47B 55/02; A47B 63/00; A47B 47/027
  See application file for complete search history.

(56) References Cited

U.S. PATENT DOCUMENTS

| | | | | |
|---|---|---|---|---|
| 2,916,161 A * | 12/1959 | Schaefer | B65D 21/0215 | 211/126.2 |
| 3,163,296 A * | 12/1964 | Hohnstein | A47B 43/00 | 211/126.6 |
| 3,172,542 A * | 3/1965 | Nawman | B65D 7/26 | 206/509 |
| 3,187,901 A * | 6/1965 | Wilson | F24B 15/00 | 211/49.1 |
| 3,202,295 A * | 8/1965 | Drader | B65D 21/0211 | 206/509 |
| 3,204,778 A * | 9/1965 | Nawman | B65D 7/26 | 211/126.9 |
| 3,219,196 A * | 11/1965 | Hare | B65D 21/0226 | 211/126.6 |
| 3,378,161 A * | 4/1968 | Lookabaugh | B65D 7/26 | 206/509 |
| 3,704,791 A * | 12/1972 | Young, Jr. | A47B 87/0261 | 211/126.9 |
| D235,729 S * | 7/1975 | Parziale | D23/410 | |
| 3,907,161 A * | 9/1975 | Martin | B65B 43/44 | 221/211 |
| D243,504 S * | 3/1977 | Morrison | D23/410 | |
| 4,240,549 A * | 12/1980 | Hogg | A47F 13/00 | 211/49.1 |
| 4,264,081 A * | 4/1981 | Markham | B62B 3/10 | 211/49.1 |
| 4,534,475 A * | 8/1985 | Mayo | A47B 87/0261 | 211/126.14 |
| 4,600,108 A * | 7/1986 | Scott | A47B 81/007 | 211/49.1 |
| 4,616,757 A * | 10/1986 | Hobson | B27B 17/0041 | 248/300 |
| D289,080 S * | 3/1987 | Einsel | D23/410 | |
| 4,765,491 A * | 8/1988 | Mueller | F24B 15/00 | 211/49.1 |
| 4,807,381 A * | 2/1989 | Southard | A47B 81/005 | 211/64 |
| 4,872,580 A * | 10/1989 | Fuller | A47F 5/005 | 211/11 |
| 4,926,748 A * | 5/1990 | Smith | B65B 27/083 | 248/153 |
| D330,648 S * | 11/1992 | Lippert | D6/678.4 | |
| 5,280,933 A * | 1/1994 | Finneyfrock | F24B 15/00 | 211/49.1 |
| D362,945 S * | 10/1995 | Glinski | D34/12 | |
| 5,651,467 A * | 7/1997 | Moran, III | F24B 15/00 | 211/49.1 |
| 5,743,413 A * | 4/1998 | Noll | A47B 45/00 | 211/175 |
| 6,279,763 B1 * | 8/2001 | Bush | B65D 88/522 | 211/85.5 |
| 6,290,073 B1 * | 9/2001 | Barnes, Sr. | F24B 15/00 | 211/175 |
| 6,508,376 B1 * | 1/2003 | Chiang | B42F 15/0094 | 220/6 |
| 6,997,332 B1 * | 2/2006 | Alexander | A47B 47/027 | 211/60.1 |
| D642,671 S * | 8/2011 | Alexander | D23/410 | |
| D682,410 S * | 5/2013 | Hester | D23/410 | |
| 8,528,754 B2 * | 9/2013 | Noniewicz | B27B 21/00 | 211/49.1 |
| D713,955 S * | 9/2014 | Hester | D23/410 | |
| 9,648,953 B1 * | 5/2017 | Kuo | A47F 5/01 | |
| D820,620 S * | 6/2018 | McLoud | D6/681.1 | |
| 10,414,421 B1 * | 9/2019 | Westmoreland | B62B 3/10 | |
| D956,948 S * | 7/2022 | Lin | D23/410 | |
| 2005/0247655 A1 * | 11/2005 | Larimer | A47B 73/006 | 211/195 |
| 2013/0313211 A1 * | 11/2013 | Skvorecz | B65D 7/20 | 29/428 |
| 2015/0076086 A1 * | 3/2015 | Tsai | A47B 57/586 | 211/11 |
| 2015/0257530 A1 * | 9/2015 | Naka | A47B 47/005 | 211/188 |
| 2020/0121134 A1 * | 4/2020 | Groll | A47B 55/02 | |
| 2022/0087416 A1 * | 3/2022 | Chang Chien | B65D 11/14 | |
| 2024/0351735 A1 * | 10/2024 | Wubneh | A21B 3/13 | |

* cited by examiner

CONVEYING TOOL

TECHNICAL FIELD OF THE INVENTION

The present invention relates to a carrier for carrying firewood.

BACKGROUND OF THE INVENTION

Firewood is used as a carbon neutral fuel in heating systems such as wood stoves and rocket stoves. This type of firewood needs to be stored in an airy place to dry. Therefore, firewood is usually stored in a woodshed or an outdoor firewood storage rack for firewood. As an example of this firewood storage rack, there is a firewood rack disclosed in Patent Document 1.

Firewood can be purchased at a firewood dealer. The firewood dealer transports the firewood by truck from the firewood dealer's warehouse, and upon arrival at a user's home, the firewood is carried from the truck to user's firewood storage rack. At this time, firewood is carried with dealer's firewood carrying colander or basket. When: firewood is carried in user's basket, the user takes the firewood from the firewood storage rack, moves the firewood to the basket on the floor, lifts the basket, and carries the firewood to a firewood rack adjacent to the heating system. The user then lowers the basket to the floor and moves the firewood from the basket to the firewood rack. The user then moves the firewood into the heating system and when the rack runs out of firewood, the user replenishes the rack with firewood from the firewood storage rack.

By the way, carrying the basket with firewood is hard work, as is moving firewood from the firewood storage rack to the basket and from the basket to the firewood rack. Therefore, it is desirable to streamline these processes of carrying firewood.

PRIOR ART DOCUMENTS

Patent Documents

[Patent Document 1] Japanese Utility Model Registration No. 3163607

SUMMARY OF THE INVENTION

Problems to be Solved by the Invention

Therefore, an object of the present invention is to provide a carrier for firewood capable of efficiently carrying firewood.

Solution to the Problems

In one embodiment of the invention, a carrier for firewood has a placing frame, left and right posts, left and right gripping frames, and left and right inserting portions. The placing frame has front and rear left-right frames each extending in a left-right direction. The left-right frames are to be placed with firewood. The left and right posts each have front and rear post bodies. The post bodies each are joined to the placing frame and extend vertically. The left and right gripping frames each are bridged between each upper end of the front and rear post bodies. The left and right inserting portions each are joined to the placing frame or the left or right post. Into the left and right inserting portions, the gripping frames of another carrier are inserted from below, thereby connecting the carriers together vertically.

The left and right posts each may be collapsibly connected to the placing frame.

The placing frame may further have four vertical frames and left and right front-rear frames. The four vertical frames extend upward from the ends of the left-right frames. The left and right front-rear frames each are bridged between upper ends of the front and rear vertical frames. The left and right posts may further have front and rear bottom frames. Each bottom frame extends from each lower end of the front and rear post bodies toward the center of the left-right direction of the placing frame. In this case, the left and right posts may be collapsibly connected to the left-right frames by axis members via the front and rear bottom frames. In this case, the front and rear post bodies may be positioned inside the front-rear frames in the left-right direction, and consequently be restricted to swing in the left-right direction by the front-rear frames.

The carrier may further have left and right engaging portions. The left and right engaging portions each are joined to the front and rear post bodies, and engaged with the front-rear frame when the front and rear post bodies are upright.

The left and right inserting portions each may have an engaging portion that is engaged to the front-rear frame when the front and rear post bodies are upright.

The left and right inserting portions each may be separated in the front and rear, and may be joined to the lower part of the front and rear post bodies.

The left and right inserting portions each may have a flared shape in the front view.

Effect of the Invention

The carrier for firewood according to the present invention can be connected vertically with another carrier and stacked together with another carrier to form a multi-tiered firewood rack and firewood storage rack. Thus, firewood dealers and users carry the carrier with firewood and can use the carrier as the firewood rack and the firewood storage rack. Thereby, firewood dealers and users can eliminate the need to move firewood from the carrier to firewood storage racks, from the firewood storage racks to the carrier, or from the carrier to firewood racks, every carrying firewood. Therefore, the carrier according to the present invention can carry firewood efficiently.

DETAILED EXPLANATION OF THE PREFERRED EMBODIMENTS

The following is an embodiment of a carrier for firewood according to the present invention, with reference to the accompanying figures. In the figures, the X-axis indicates the left-right direction, the Y-axis indicates the front-rear direction, and the Z-axis indicates the vertical direction. Each axis is orthogonal to each other.

Figure 1:
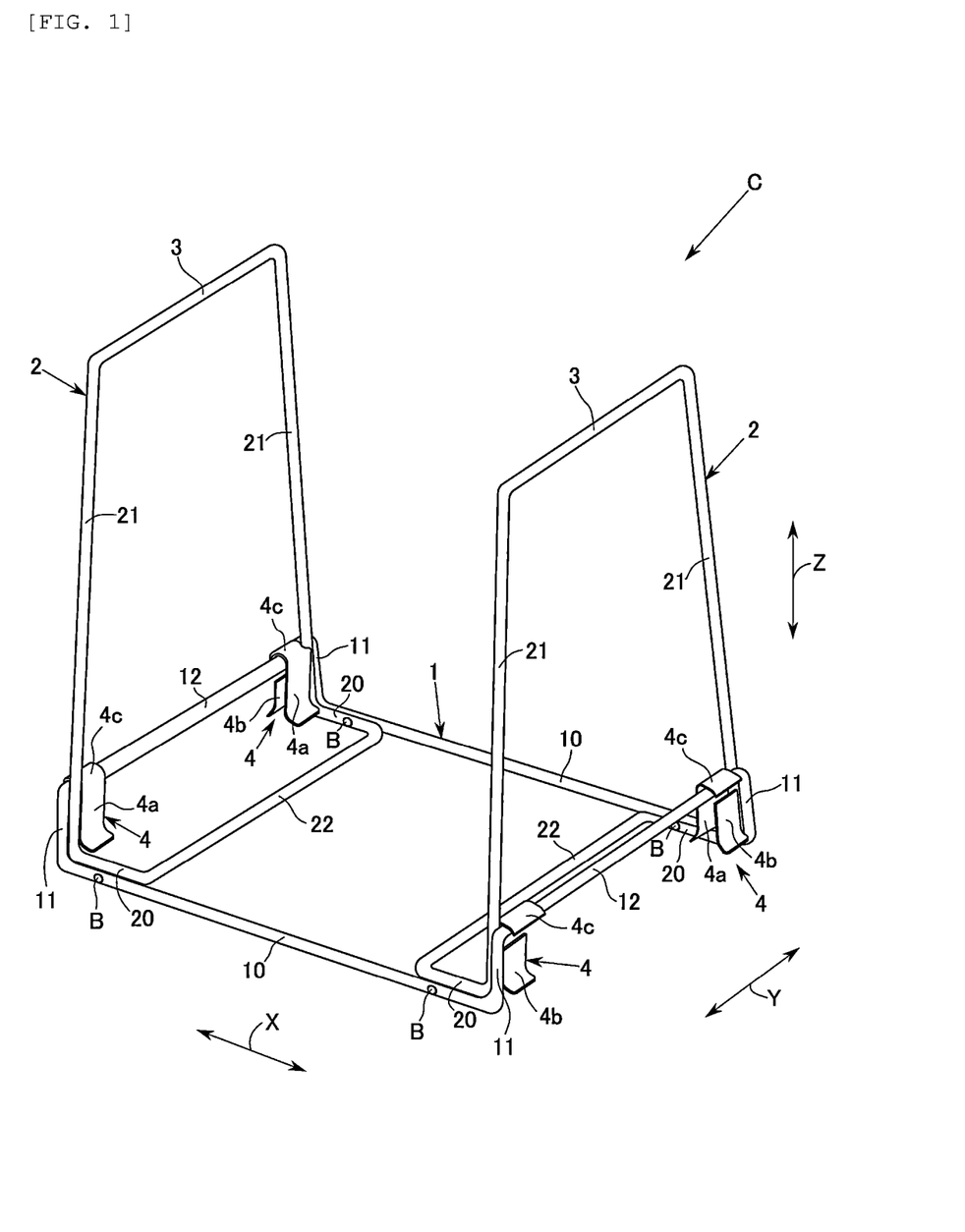
FIG. 1 is a perspective view showing a carrier according to an embodiment of the present invention.
Figure 2:
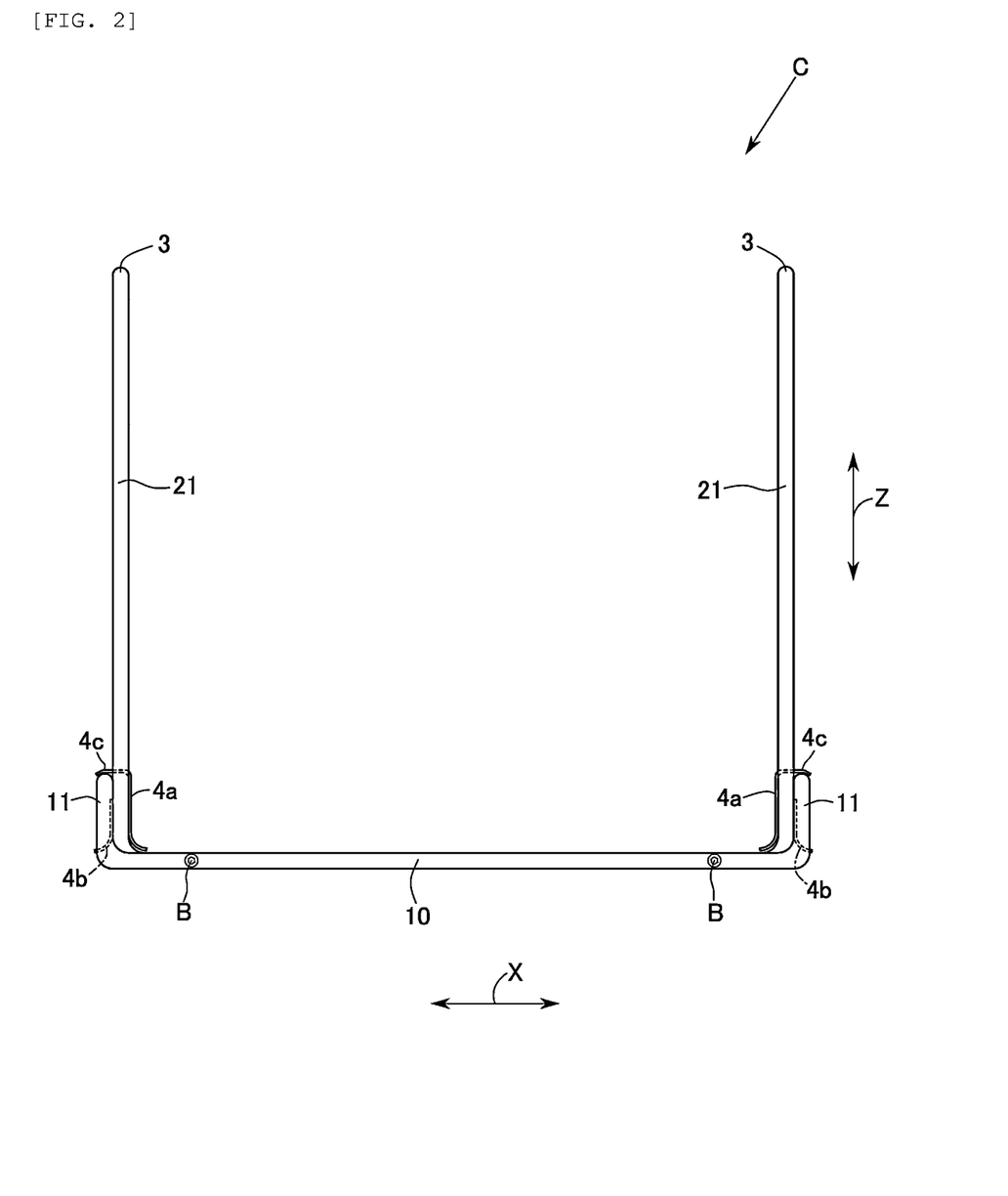
FIG. 2 is a front view of the carrier shown in FIG. 1.

As shown in FIGS. 1 and 2, the present embodiment of the carrier C has a placing frame 1, left and right posts 2, left and right gripping frames 3, and left and right inserting portions 4.

The placing frame 1 consists of, for example, steel rods, metal shafts, or metal pipes, and has front and rear left-right frames 10, four vertical frames 11, and left and right front-rear frames 12. The left-right frames 10, vertical frames 11, and front-rear frames 12 are integrally formed, but are merely an example, and may be separately and independently formed and connected to each other.

The front and rear left-right frames 10 extend in the left-right direction and are spaced front to rear and parallel to each other. The four vertical frames 11 extend upward from each end of the left-right frames 10. The left and right front-rear frames 12 each are bridged from the upper end to the upper end of the front and rear vertical frames 11. The upper surface of the left-right frames 10 are to be placed with firewood. The left and right frames 10 each may have a length of, for example, 350 mm to 450 mm. The front and rear frames 12 each may have a length of, for example, 250 mm to 350 mm.

The left and right posts 2 each consist of metal pipes, with front and rear bottom frames 20, front and rear post bodies 21, and a reinforcement frame 22. The bottom frames 20, the post bodies 21, and the reinforcement frame 22 are integrally formed, but this is merely an example. The bottom frames 20, the post bodies 21, and the reinforcement frame 22 may be formed separately and independently and connected to each other.

The front and rear bottom frames 20 are adjacent to the inside of the left-right frames 10 and extend along the left-right frames 10 in the left-right direction. The front and rear bottom frames 20 are connected to the left-right frames 10 in a collapsible manner via axis members B. The upper surface of the bottom frames 20 is configured to have the same height as the upper surface of the left-right frames 10.

The front and rear post bodies 21 are integrally formed with the bottom frame 20 and extend upward from each outer end of the front and rear bottom frames 20, being adjacent to the inside of the front-rear frames 12. In the present embodiment, the front and rear post bodies 21 each are tilted inward in the front-rear direction, and the front and rear post bodies 21 as a whole form a truncated chevron shape in a side view. The pillar body 21 may have a height of, for example, 300 mm to 400 mm.

The reinforcement frame 22 is integrally formed with the bottom frames 20 and extends from the inside edge of the front bottom frame 20 to the inside edge of the rear bottom frame 20.

The left and right gripping frames 3 each consist of metal pipes and are formed integrally with the front and rear post bodies 21. The gripping frame 3 is bridged between the upper ends of the front and rear post bodies 21. The gripping frame 3 is to be gripped by a user when the carrier C is carried. The gripping frame 3 and the post bodies 21 are integrally formed, but this is merely an example. The gripping frame 3 may be formed separately and independently and connected to each other.

Figure 3:
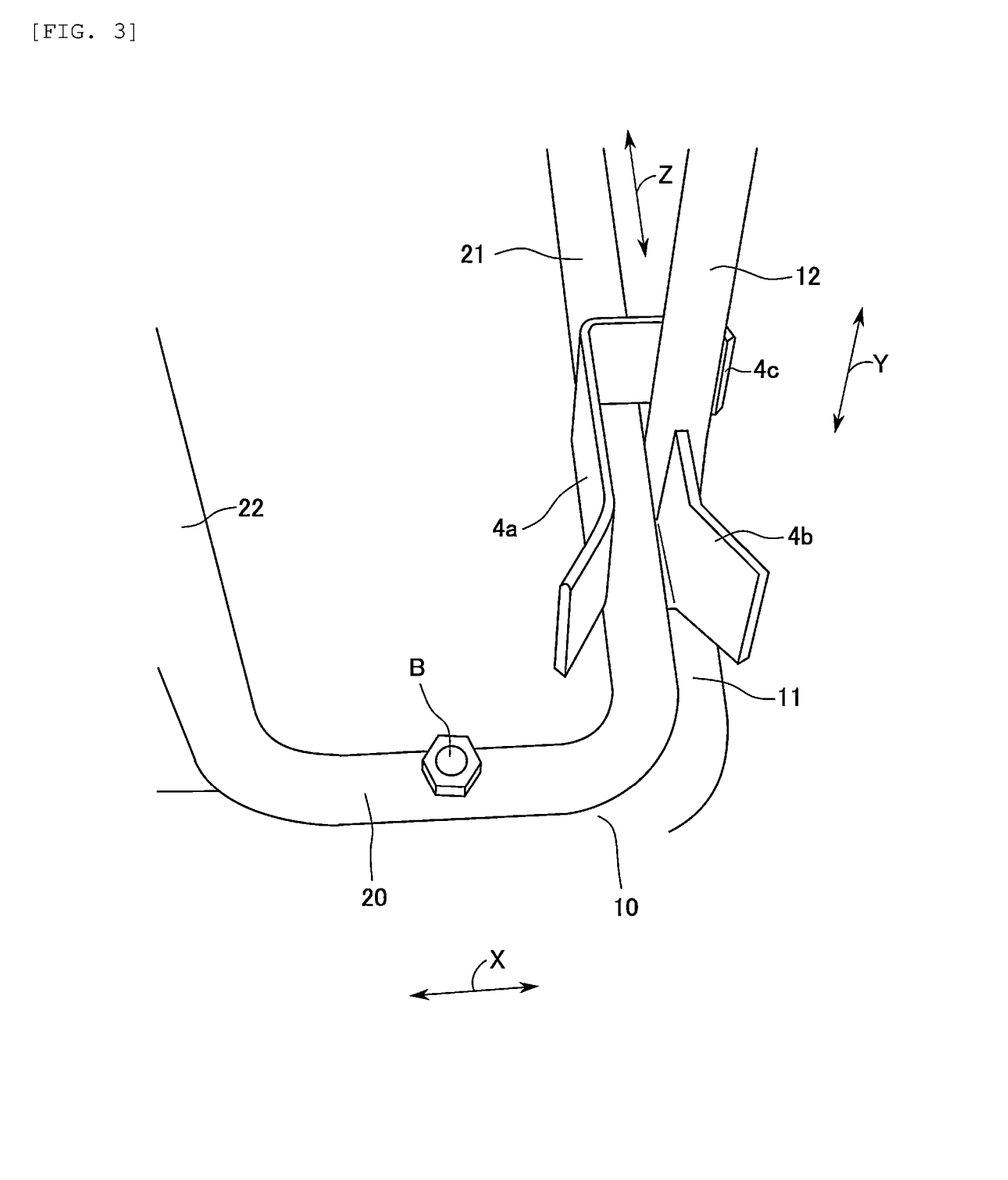
FIG. 3 is a perspective view of the inserting portion shown in FIG. 1.

As shown in FIGS. 1 and 3, the left and right inserting portions 4 each are separated front to back and welded to the lower portions of the front and rear post bodies 21. The inserting portion 4 consists of a plate member 4a and a plate member 4b that are welded to the lower portion of the post body 21 and that are provided inside or outside of the post body 21 in the left-right direction. As shown in FIGS. 1 to 3, the inserting portion 4 is formed in a flared shape in front view by the plate members 4a and 4b. The inserting portion 4 is inserted with the gripping frame 3 of another carrier C, as will be described later.

The upper part 4c of the plate member 4a is hook-shaped in front view, and when the post body 21 is upright, the upper part 4c is engaged to the front-rear frames 12 to stabilize the upright state of the post body 21. This hook-shaped portion 4c corresponds to the "engaging portion" 4c of the present invention.

The user places firewood W on the upper surface of the left-right frames 10 and grips the gripping frame 3 to lift the carrier C and carries firewood W. In the present embodiment of the carrier C, the left-right frames 10 restrict the opening of the post body 21 in the left-right direction, and the engaging portion 4c restricts the inward swing of the post body 21, so the upright state of the post 2 is stable. In addition, the upper surface of bottom frame 20 is configured to be the same height as the upper surface of left-right frame 10, so that firewood W is also placed on bottom frame 20. As a result, the weight of firewood W also regulates the swing of post 2. This allows the user to properly carry firewood W. Furthermore, carrier C in the present embodiment is small enough for women to carry, and lightweight with pipe-shaped material.

Figure 4:
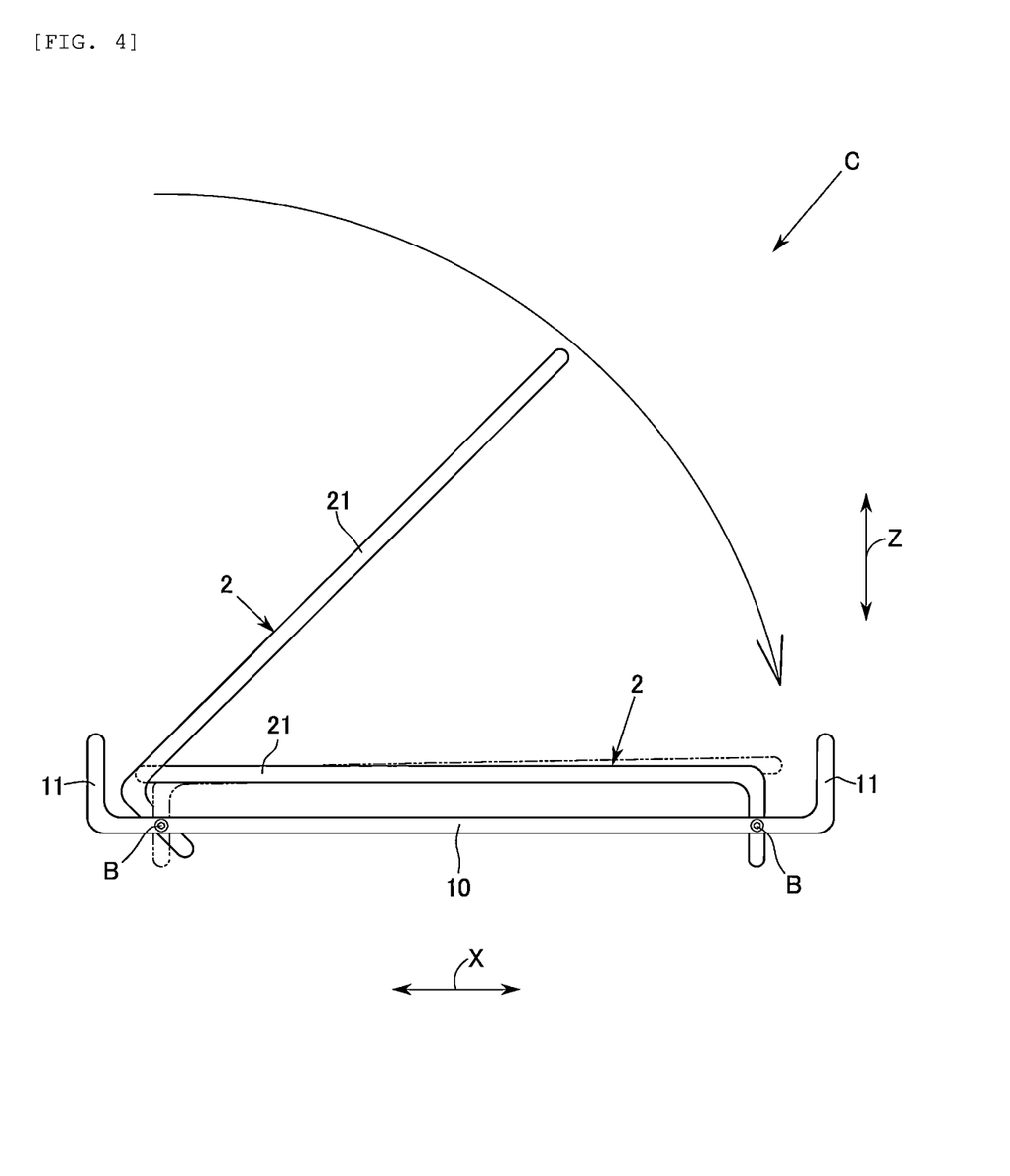
FIG. 4 shows the carrier shown in FIG. 1 placed with firewood and stacked.

As shown in FIG. 4, the left and right posts 2 each can be folded inward by pivoting the axis members B as a pivot point. In the present embodiment, the front and rear post bodies 21 have a truncated chevron shape in a side view, so that the upper part of one post body 21 can be accommodated inside the lower portion of the other post body 21. This allows the carrier C to be compactly stored when not in use.

Figure 5:
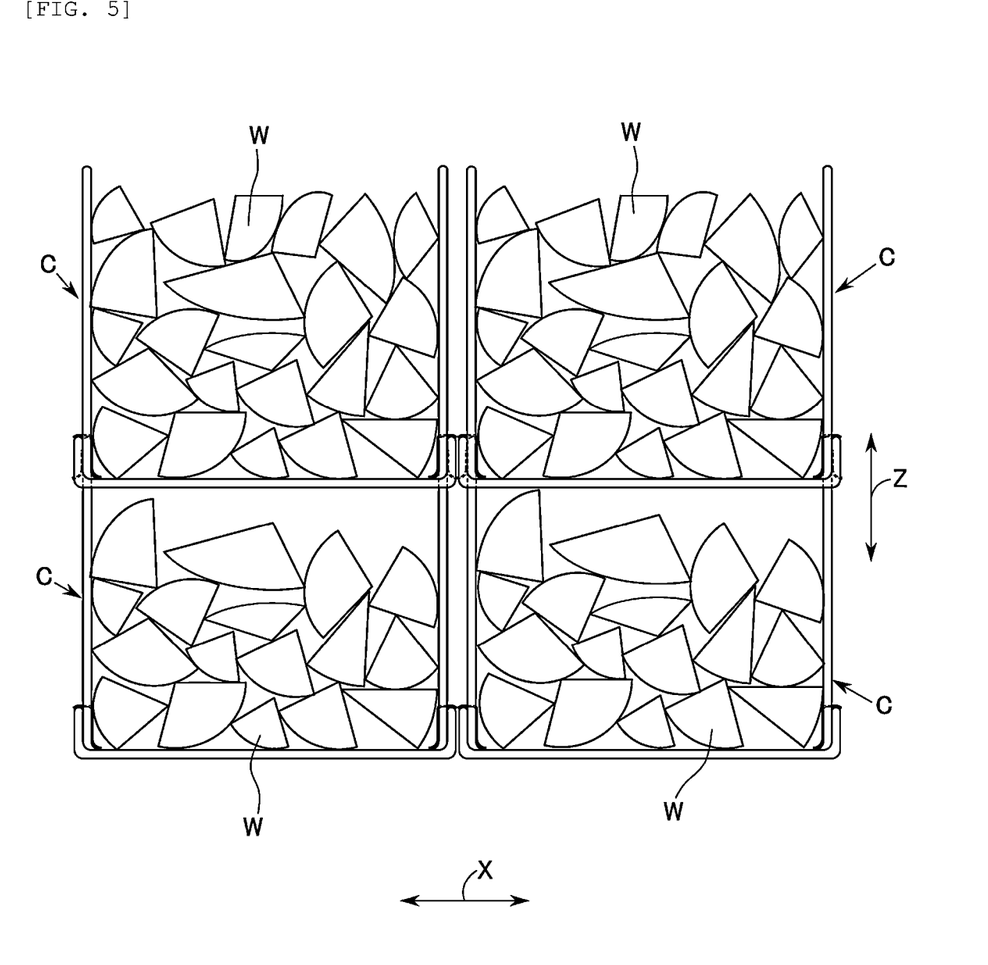
FIG. 5 is a front view of the carrier shown in FIG. 1 when the carrier is folded.

As shown in FIG. 5, multiple carriers C can be stacked by inserting the gripping frame 3 of the lower carrier C into the inserting portion 4 of the upper carrier C. Thus, the carrier C can serve as a carrier C for carrying firewood W, as well as a firewood storage rack for storing firewood W and a firewood rack.

Figure 6:
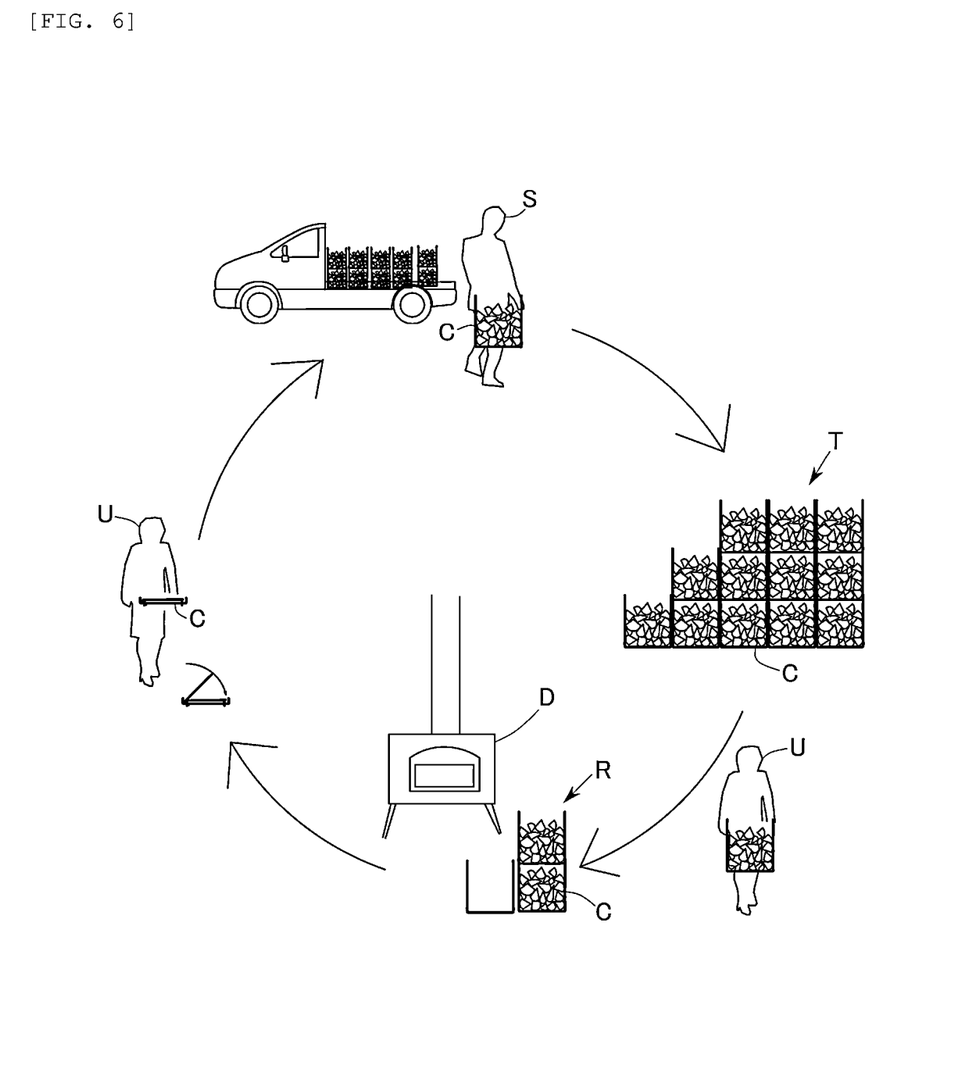
FIG. 6 shows a cycle of operation of the carrier by a firewood dealer and a user.

As shown in FIG. 6, the firewood dealer S can place firewood W in carriers C of the present embodiment and load carriers C with the firewood W on a truck and transport them from the warehouse of the firewood dealer to the user U's home. The firewood dealer S can then carry the carriers C with firewood W from the truck to a predetermined place in the user U's home to form a firewood storage rack T. This allows firewood dealer S to avoid loading firewood W transported by truck into a basket. Moreover, firewood dealer S can also eliminate placing firewood W from the basket onto user U's firewood storage rack T.

As shown in FIG. 6, when user U carries firewood W close to the heating system D, they lift up the carrier C with firewood W and carry the carrier C close to the heating system D. This eliminates the need for user U to load firewood W from the firewood storage rack T to the basket. Moreover, the user U can also skip placing the firewood W from the basket onto the firewood rack R. Furthermore, the carrier C can be compactly folded by folding post 2 when the firewood W is emptied. As a further benefit of carrier C, carrier C also serves as the carrier C for the firewood W, the firewood storage rack T, and the firewood rack R, eliminating the need to purchase each separately and thus contributing to the cost. In addition, Carrier C in the present embodiment makes Carrier C, in which firewood W is stored, easy to change its position. Thus, it is easy to organize the firewood W such that Carrier C with the new firewood W is on the bottom and Carrier C with the old firewood W is on the top. Furthermore, according to Carrier C, the user may enter into a contract with firewood dealer S for a cycle in which the user gives the empty Carrier C to firewood dealer S, who returns Carrier C with the firewood W in it at the next purchase of firewood W. This has the advantage for firewood dealer S to keep its customers (user U) firmly connected.

Although the above-described embodiment of the present invention has been described, the carrier according to the present invention is not restricted to the above-described embodiment. For example, the carrier of the present invention may be implemented by the following variations.

The carrier C is not limited to a metal material such as steel, stainless steel, aluminum, or duralumin. For example, the carrier C may be made of carbon fiber or wood. The carrier C is not limited to a circular cross-sectional shape of each frame. For example, the carrier C may have a non-circular cross-sectional shape of each frame.

The engaging portion 4c may be separately and independently from the inserting portion 4 and joined to the post body 21.

The reinforcement frame 22 is not an essential component. For example, instead of the reinforcement frame 22, an engaging portion may be provided on the lower frame that is engaged to the left and right frames 10.

The left and right inserting portions 4 each may, for example, not be separated front and rear, but the front and rear inserting portions 4 may be formed integrally and extend in a front-rear direction.

DESCRIPTION OF THE REFERENCE CHARACTERS

C carrier
W firewood
B axis member
S firewood dealer
T firewood storage rack
R firewood rack
U user
D heating system
1 placing frame
10 left-right frame
11 vertical frame
12 front-rear frame
2 post
20 bottom frame
21 post body
22 reinforcing frame
3 gripping frame
4 inserting portion
4a, 4b plate member
4c engaging portion

The invention claimed is:

1. A carrier for firewood, comprising:
 a placing frame comprising front and rear left-right frames each extending in a left-right direction, on which the firewood is configured to be placed;
 left and right posts each comprising front and rear post bodies that are joined to the placing frame and that extend vertically;
 left and right gripping frames each being bridged between upper ends of the front and rear post bodies; and
 left and right inserting portions each being joined to the left and right posts, into which gripping frames of another carrier are configured to be inserted from below to connect the carriers together vertically,
 wherein the front and rear post bodies and the gripping frame define opening;
 wherein the post bodies are inclined each are tilted inward in a front-rear direction;
 wherein each of the left and right inserting portions comprises a pair of plate members spaced apart from each other in the left-right direction; and
 wherein, when the gripping frames of the another carrier are inserted between the pair of plate members of the corresponding inserting portions, upper portions of the front and rear post bodies of the another carrier are configured to be inserted between the pair of plate members and to be placed adjacent to inner sides of the front and rear post bodies of the carrier.

2. The carrier according to claim 1, wherein the left and right posts each are collapsibly connected to the placing frame.

3. The carrier according to claim 2,
 wherein the placing frame further comprises four vertical frames extending upward from ends of the left-right frames, and left and right front-rear frames each being bridged between upper ends of respective front and rear vertical frames from the four vertical frames,
 wherein the left and right posts further comprise front and rear bottom frames extending from lower ends of the front and rear post bodies toward a center in the left-right direction of the placing frame, and are collapsibly connected to the left-right frames by axis members via the front and rear bottom frames, and
 wherein the front and rear post bodies are positioned inside the front-rear frames in the left-right direction, and the front and rear post bodies are configured to be restricted to swing in the left-right direction beyond the front-rear frames.

4. The carrier according to claim 3, further comprising left and right engaging portions each provided on the front and rear post bodies, and each engaged with the front-rear frame when the front and rear post bodies are upright.

5. The carrier according to claim 3, wherein the left and right inserting portions each have an engaging portion that is engaged with the front-rear frame when the front and rear post bodies are upright.

6. The carrier according to claim 1, wherein the left and right inserting portions each are separated into front and rear sections, and respectively provided on lower parts of the front and rear post bodies.

7. The carrier according to claim 1, wherein the left and right inserting portions have a flared shape in a front view.

* * * * *